United States Patent [19]

Marzouk

[11] 4,070,105
[45] Jan. 24, 1978

[54] LAMINAR FRESNEL REDUCED OPHTHALMIC LENS CONSTRUCTION

[76] Inventor: Marzouk Youssef Marzouk, 503 S. Fifth St., San Jose, Calif. 95112

[21] Appl. No.: 664,154

[22] Filed: Mar. 5, 1976

[51] Int. Cl.² .............................................. G02C 7/02
[52] U.S. Cl. ..................................... 351/159; 351/172
[58] Field of Search ............... 351/159, 172, 175–177; 350/211

[56] References Cited

U.S. PATENT DOCUMENTS

| | | | |
|---|---|---|---|
| 1,948,636 | 2/1934 | Tillyer | 351/176 |
| 2,077,092 | 4/1937 | Broder | 351/176 |
| 3,182,576 | 5/1965 | Papke | 350/211 X |
| 3,628,854 | 12/1971 | Jampolsky | 351/175 |
| 3,735,685 | 5/1973 | Plummer | 351/176 X |
| 3,809,461 | 5/1974 | Baumgardner et al. | 350/211 X |
| 3,827,798 | 8/1974 | Alvarez | 350/211 X |
| 3,877,798 | 4/1975 | Tolar et al. | 351/176 X |

FOREIGN PATENT DOCUMENTS

| | | | |
|---|---|---|---|
| 1,154,360 | 6/1969 | United Kingdom | 351/159 |
| 1,231,402 | 5/1971 | United Kingdom | 350/211 |

Primary Examiner—Paul A. Sacher
Attorney, Agent, or Firm—Thomas Schneck, Jr.

[57] ABSTRACT

A multi-element ophthalmic lens construction is disclosed wherein a plurality of two element lens pairs are bonded together to form an ophthalmic lens. Each pair forming a combination has internally mating, Fresnel reduced, corrector shapes. However, each element of the pair has a different index of refraction whereby each lens pair achieves a desired power.

14 Claims, 7 Drawing Figures

MAX. SPHERICAL
MIN. CYLINDRICAL

MAX. CYLINDRICAL
MIN. SPHERICAL

4,070,105

LAMINAR FRESNEL REDUCED OPHTHALMIC LENS CONSTRUCTION

BACKGROUND OF THE INVENTION a. Field of the Invention

This invention relates to lenses and more particularly, to an ophthalmic lens construction which can be made without grinding and polishing.

b. Prior Art

Most manufacturers of ophthalmic lenses produce a large number of lenses because of the wide variances in ophthalmic corrections that are required. For example, meniscus or spherical lenses are made with powers between −7.00D and +7.00D, usually in 0.25D steps. Toric lenses, i.e. cylindrical lenses, combine a cylindrical element of 4.00D, usually in 0.25D steps with the same range of spherical power mentioned above. Thus, it may be seen that a large number of corrections faces ophthalmic lens manufacturers. In addition to the above-mentioned corrections, prismatic, bifocal, multifocal and tints may add further variety to the manufacturing process.

Ophthalmic practitioners usually send an order to a factory where prescription lenses may be ground and polished to the desired correction. It has been a long standing desire of such practitioners to be able to construct lenses in their own laboratories without ordering corrective lenses from a distant factory.

It has long been known that a desired degree of correction for a lens may be accomplished by combining, such as by bonding together, several stock lenses. Moreover, it has been known that the thickness of thick ophthalmic lenses may be reduced by means of Fresnel reduction, see for example British Pat. No. 1,154,360, granted Feb. 1, 1967 and incorporated by reference herein. The method of making reduced thickness lenses of the Fresnel type is the subject of U.S. Pat. No. 3,827,798 granted Aug. 6, 1974 to Luis Alvarez, which patent is also incorporated by reference herein.

It is known that polarizing lenses may be made of lenticular layers of different indices of refraction, see for example U.S. Pat. Nos. 3,213,753 and 3,522,985.

It is an object of my invention to devise a relatively thin ophthalmic lens which may be made in a small laboratory without grinding and polishing.

SUMMARY OF THE INVENTION

The above object is achieved with a multi-element ophthalmic lens constructed by bonding together a plurality of two element lens pairs. Each of the two elements of a lens pair has a conventional smooth side and an opposed corrector side which is reduced in thickness by Fresnel lens reduction. The two elements of a lens pair have mirror image Fresnel corrector surfaces which mate with each other so that the lens pair has externally smooth surfaces and internally mating Fresnel reduced corrector surfaces. One member of the two element lens pair has a first index of refraction while the second element of the two element lens pair has a second index of refraction. The index of refraction controls the power of a lens surface by the formula $(N - 1) = Dr$, where $D$ is the power of the lens in diopters and $r$ being the radius of curvature of the lens in meters and $N$ the refractive index of the lens material. For crown glass, $N = 1.523$.

Because of the availability of new plastic materials which are optically clear, well known to those skilled in the art, the index of refraction of lenses is now widely variable. Accordingly, by selecting an appropriate plastic or glass for various elements of a two element lens pair, each lens pair may achieve a desired degree of correction.

Moreover, if the corrector shape is selected to be a toric surface a wide variety of corrections may be achieved by combining two, two element lens pairs and rotating them with respect to each other, thereby combining two toric surfaces with each other. Since the external surfaces of the two element pairs are smooth, and having the same curvature, rotation may be achieved between the first and second two element lens pairs, while keeping the two in close contact. In a similar manner, third, fourth and other two element pairs may be added to achieve other needed lens corrections, such as prismatic and bifocal corrections. The power for each of these corrections again may be controlled by the index of refraction of the material of the members of each two element pair. Fresnel reduction permits construction of a lens approximately 1 millimeter thick, so that an assembly of three or four correctors made in accord with the present invention will only be 3 or 4 millimeters thick, regardless of overall diameter.

The invention will be more clearly understood with reference to the drawings.

DESCRIPTION OF THE PREFERRED EMBODIMENT

Figure 1:
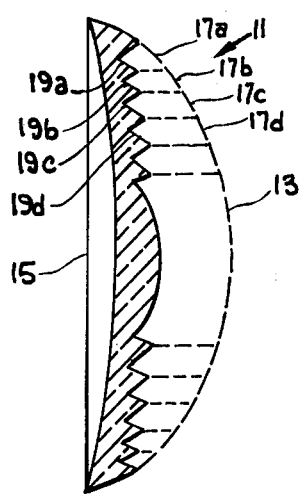
FIG. 1 is a side view of a lens reduced by Fresnel reduction.

FIG. 1 shows the manner in which the thickness of an ophthalmic lens may be reduced by means of Fresnel rings or echelons, as known in the prior art. A lens 11, having a convex face indicated by the dashed line 13 and a rearward face indicated by the solid line 15 may be reduced in thickness by means of Fresnel reduction, a technique in which segments of the surface 13 are placed in an array which is relatively close to the rearward lens face 15. For example, lens segments 17a, 17b, 17c, 17d, and so on are projected downwardly, closer to back lens face 15, but in parallel alignment with their former position. The ridges connecting adjacent downwardly projected lens segments 19a, 19b, 19c, and so on should be as close to vertical as possible, as shown in the aforementioned British Pat. No. 1,154,360. The reason for this is that ophthalmic correction is achieved by the lens segments 19a, 19b, 19c and so on, not by the glass connecting adjacent segments. Ophthalmic lenses made by this technique may be made very thin, as recognized in the prior art.

Figure 2:
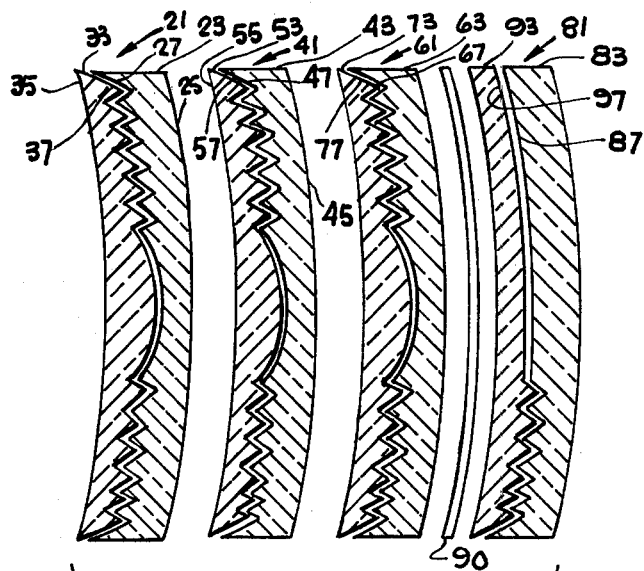
FIG. 2 is a side exploded view of a lens construction in accord with the present invention.

FIG. 2 shows a side view of a plurality of two element lens pairs, pulled apart in an exploded side view showing a manner of assembly. In final assembly, the lens pairs would be mutually bonded together, both among members of the pairs and among the various lens pairs. The side view of FIG. 2 represents round lenses which may later be trimmed to any desired spectacle shape.

A typical two element lens pair 21 comprises a first optical element having a smooth, front, convex side 25 which defines a first preselected curved shape. This shape may be a shape which in combination with the rear surface 35 of the two element pair has corrective power or it may be plano, i.e. without corrective power with respect to the rear surface 35.

The rear side 27 of element 23 defines a preselected curved shape, preferably a toric surface, for achieving ophthalmic correction.

The shape of the toric surface which is selected for manufacture is one which will provide maximum flexibility in fitting a wide range of ophthalmic corrections. An arbitrary example of one such correcting surface may have a curvature which is characterized as spherical +5.4D; cylindrical +3.0D. This example will be discussed further, infra.

A second optical element 33 of the two element lens pair 21 has a smooth, rear, concave side 35 defining a third preselected curved shape. In practice, the third preselected shape of side 35 is a meniscus shape which is the same shape as the smooth front convex side 25 and the same curved shape as the first optical element so that the net corrective effect of sides 25 and 35 is 0 or plano. The concave side 35 is selected to have a pleasant wrap around the eye. One of the features of the present invention is that members of the two element lens pairs described herein can be made from a very limited number of molds, as described below, and therefore a combination of plano sides 25 and 35 is preferable. The second optical element 33 has a front side 37 defining a fourth shape, which is corrective, and reduced in thickness by a second plurality of Fresnel rings which mate with the first plurality of Fresnel rings which reduce the thickness of element 23. The corrective surface of the front side 37 of element 33 may be said to be a mirror image of the rear side 27 of element 23, which defined a toric surface. Thus, the element sides 27 and 37 are mating toric surfaces.

One important difference between elements 23 and 33 is that element 23 is made of a material having a first index of refraction while the second optical element 33 is made of material having a second index of refraction. The index of refraction controls the power of a lens in accord with the formula $N-1=Dr$, where $D$ is the power of a lens surface in diopters and $r$ is the radius of curvature in meters, and $N$ is the refractive index of the material. A diopter, $D$, is the reciprocal of the focal length in meters.

It was stated above that the corrective sides 27, 37 of the two element lens pair 21 was a toric surface. A second two element lens pair 41 is provided in the combination shown in FIG. 2. The two element lens pair 41 may be immediately adjacent to the first two element lens pair 21 or may be one of the other two element lens pairs of FIG. 2. The precise spacing is not important because the smooth sides 45 and 55 of the lens pair are selected to mate with corresponding surfaces of an adjacent two element lens pair in a concave-convex mating relationship. The two element lens pair 41 includes a first optical element 43 which has a smooth, front, convex side 45 defining a first preselected curved shape which is preferably the same as the smooth rear side 55 of the second optical element 53, thereby giving the smooth front and rear surfaces a plano correcting power which is the same construction as the lens pair 21. The rear side 47 of the first element 43 defines a second preselected curved shape, which is preferably a toric surface, reduced in thickness by a first plurality of Fresnel rings. The toric surface may be the same as the surface on rear side 27 of the first element 23 of the two element lens pair 21.

A second optical element 53 is provided with a smooth, rearward, concave side 55 defining a third preselected curved shape which, as previously mentioned, may be similar to the smooth, front, convex side 45. Front side 57 of the second optical element 53 defines a fourth shape which meets with the surface 47 of the first optical element. The aforementioned fourth shape is reduced in thickness by a second plurality of Fresnel rings or echelons which mates with the first plurality of Fresnel rings or echelons and may be cemented together in intimate contact therewith, and without any voids or air spaces therein. A bonding means, such as an adhesive may be used to hold two optical elements of any two element pair together. Alternatively, bonding may be done ultrasonically. Preferably, the adhesive is selected to have an index of refraction between or equal to the two indices of refraction of the materials of the two element lens pair. The second two element pair 41 has a first optical element 43 made of a material having a first index of refraction, while the second element 53 is made of a material having a second index of refraction wherein the material is selected such that the index of refraction of each material will have a desired corrective power.

Figure 3:
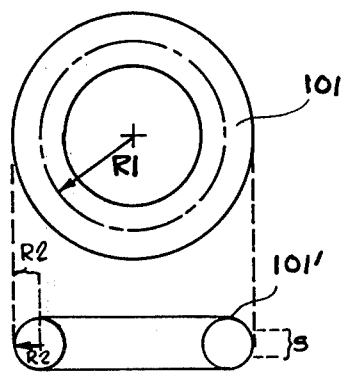
FIG. 3 is a top and side cutaway view of a toric surface.

The advantage and utilization of two, two element lens pairs, 21 and 41, can be understood as follows. FIG. 3 is a plan view of the geometry of toric surfaces. A torus 101 has an outer circular radius R1. In side view, the torus 101' has a cylindrical radius R2. A toric surface, as referred to herein is a surface having a cylindrical radius R2 and a circular radius R1. Such a toric surface is a surface taken anywhere along the periphery of a torus, such as the surface S indicated in FIG. 3. Thus, from FIG. 3, it is seen that a toric surface will have curvature characterized by a circular radius, termed a spherical radius, as well as a cylindrical radius. The two radii are orthogonal to each other and one radius is characterized by maximum curvature or corrective power, while the other radius is characterized by minimum curvature or corrective power.

Figure 4:
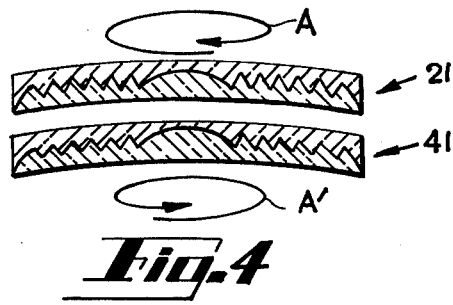
FIG. 4 is a side view of two, two element Fresnel reduced lens pairs in which the corrector elements are toric surfaces to be oppositely rotated with respect to each other.

When two, two element lens pairs, such as the pairs 21 and 41 of FIG. 2, have corrective surfaces which are toric surfaces, reduced by Fresnel reduction, the powers of the two pairs may be adjusted with respect to each other as shown in FIG. 4. In FIG. 4, the two, two element lens pairs may be rotated with respect to each other in the directions indicated by the arrows A and A' to achieve a desired power. This is more clearly understood with reference to FIG. 5.

Figure 5:
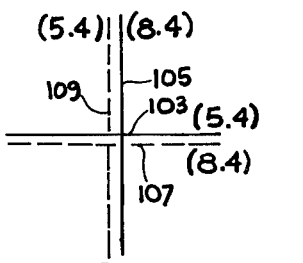
FIGS. 5 and 6 indicate exemplary corrective powers which may be achieved by means of the rotation indicated in FIG. 4.

In FIG. 5, the powers of a first, two element lens pair characterized by a toric corrective surface is designated by a spherical axis 103 and a cylindrical axis 105. The power, in diopters, associated with the axis, is a numeral in parenthesis next to the axis with which it is associated. The corrective power of the lens having axes 103, 105 is spherical +5.4 and cylindrical +3.0, according to the system known to those skilled in the art.

FIG. 5 shows a second pair of axes 107, 109, representing a second two element lens pair having the same corrective toric surface as the first two element pair characterized by the axes 103, 105. By orthogonal alignment of the toric axis, as shown in FIG. 5 it is possible to maximize the spherical correction of the system. Usually a combination of two, two element lens pairs would not have such a configuration because maximum spherical correction could conceivably be achieved with one two element lens pair whose power could be suitably increased by an appropriate selection of the indices of refraction. However, materials may not be available to give a sufficient spherical correction and in that instance, the arrangement of FIG. 5 may be adopted.

Figure 6:
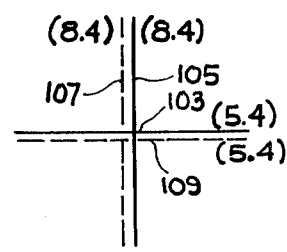

By rotating one set of axis with respect to the other, as indicated by the arrows in FIG. 4, varying degrees of spherical and cylindrical correction can be achieved. In FIG. 6, maximum cylindrical correction is illustrated by 90° rotation of the axis shown in FIG. 5. The power of the lens in FIG. 6 is spherical +10.8 and cylindrical +6.0. If the rotation of the two, two element lens pairs of FIG. 4 were less than the 90° rotation indicated between FIGS. 5 and 6, the cylindrical correction would be between $0_1$ as indicated in FIG. 5 and the maximum cylindrical correction indicated in FIG. 6. Of course, the amount of spherical correction is also varying, but an approximation to most ophthalmic prescriptions can be obtained by using two or possibly three toric corrector two element pairs in accord with the present invention. The pairs are bonded together by means of an adhesive once the appropriate alignment has been achieved.

It is not only toric surface corrections which may be achieved by this system, but also filters, prismatic corrections and bifocal corrections. In FIG. 2, the third two element lens pair 61 which has a first optical element 63, a second optical element 73. Each of these optical elements may have internal, mating corrector surfaces 67, 77 which are prismatic. By making the optical elements 63, 73 of different materials, such that different indices of refraction are present, the power of the two element lens pair may be controlled and a desired prismatic adjustment may be achieved.

Figure 7:
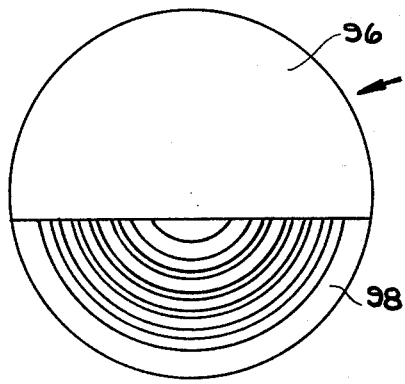
FIG. 7 is a frontal view of a bifocal ophthalmic lens according to the invention.

Similarly, another two element lens pair 81 may be provided with a first optical element 83 and a second optical element 93. Internally mating, Fresnel reduced surfaces 87, 97 may be bifocal surfaces constructed as shown in FIG. 7. The corrector surface 97 has an upper half 96 which is essentially plano and a lower half surface which is spherical to the extent required and Fresnel reduced by a plurality of semicircular Fresnel rings. An appropriate spherical power may be achieved by selecting an appropriate material having a desired index of refraction. Since the bifocal correctors are usually intended for use in reading, the bifocal corrector portion of lens 57 is maintained in the lower or upper upper half of a multi-element ophthalmic lens combination.

Besides bifocal and prismatic corrections, chromatic corrections may be made using the corrective techniques taught herein to compensate for dispersion.

One of the chief advantages of the present lens construction is that an ophthalmic practitioner need only have a few molds for casting elements made of materials having various indices of refraction. Most of these materials will be plastic materials having widely varying indices of refraction. Changing the index of refraction provides the desired corrective power, as shown above, and the need for grinding and polishing of lenses may be avoided.

FIG. 2 also shows that one or more filters, 90, may be added to achieve a desired optical bandpass or band rejection.

In review it may be seen that the method of making ophthalmic lenses as taught herein may be practiced by making or casting a plurality of two element lens pairs wherein each pair has internally mating, Fresnel reduced, corrector shapes and each pair has its power defined by a different index of refraction for each lens element. To achieve cylindrical correction, the corrector shapes of at least two, two element pairs are toric surfaces. When this is the case, one pair is rotated with respect to the other until a desired ophthalmic correction is achieved, then the two, two element pairs are bonded in place.

Whereas, my invention has been discussed with respect to ophthalmic lenses, it is clear that the teachings of my invention pertain to general lens construction.

I claim:

1. An ophthalmic lens comprising,
a first optical element having a front, convex, side defining a first preselected curved shape, a rear side defining a second preselected curved shape which is toric and reduced in thickness by a first plurality of Fresnel echelons and made of a material having a preselected first index of refraction,
a second optical element having a rear, concave, side defining a third preselected curved shape identical to said first preselected curved shape, a front side defining a fourth, curved, preselected shape, which is toric and reduced in thickness by a second plurality of Fresnel echelons mating with said first plurality of Fresnel echelons and made of a material having a preselected second index of refraction, and
a first bonding means for bonding said first and second optical elements together.

2. The apparatus of claim 1 further comprising,
a third optical element having a front, convex, side defining a fifth preselected curved shape, a rear side defining a sixth preselected curved shape which is toric and reduced in thickness by a third plurality of Fresnel echelons and made of a material having a third index of refraction,
a fourth optical element having a rear, concave, side defining a seventh preselected curved shape, identical to said fifth preselected curved shape which, in turn, is identical to said first preselected curved shape, a front side defining an eighth curved, preselected shape which is toric and reduced in thickness by a fourth plurality of Fresnel echelons mating with said third plurality of Fresnel echelons and made of a material having a fourth index of refraction, and
second bonding means for bonding said third and fourth optical elements together, and third bonding means for bonding the combination of first and second optical elements to the combination of third and fourth optical elements at a rotational angle between said combinations such that the alignments of said toric shapes gives a desired ophthalmic correction.

3. The apparatus of claim 2 further comprising,
a fifth optical element having a front, convex, side defining a ninth preselected curved shape, a rear side defining a tenth prismatic, shape reduced in thickness by a fifth plurality of Fresnel echelons and made of a material having a fifth index of refraction, a sixth optical element having a rear, concave, side defining an eleventh preselected curved shape, identical to said ninth preselected curved shape which, in turn, is identical to said first preselected curved shape, a front side defining a twelfth prismatic, shape, reduced in thickness by a sixth plurality of Fresnel echelons mating with said fifth plurality of Fresnel echelons and made of a material having a fourth index of refraction and third bonding means for bonding said fifth and sixth optical elements together, and fourth bonding means for bonding the combination of fifth and sixth optical elements to the combination of third and fourth optical elements.

4. The apparatus of claim 2 further comprising, a fifth optical element having a front, convex, side defining a ninth, preselected curved shape, a rear side defining a tenth, bifocal, shape reduced in thickness by a fifth plurality of Fresnel echelons and made of a material having a fifth index of refraction, a sixth optical element having a rear, concave, side defining an eleventh preselected curved shape, identical to said ninth preselected curved shape which, in turn, is identical to said first, preselected curved shape, a front side defining a twelfth, bifocal, shape, reduced in thickness by a sixth plurality of Fresnel echelons mating with said fifth plurality of Fresnel echelons and made of a material having a fourth index of refraction, and a third means for bonding said fifth and sixth optical elements together, and a fourth means for bonding the combination of fifth and sixth optical elements to the combination of third and fourth optical elements.

5. The apparatus of claim 1 wherein said first preselected curved shape is the same as said third preselected curved shape.

6. The apparatus of claim 2 wherein one of said convex fifth and concave seventh sides is adhesively bonded to one of said convex first and concave third sides in a juxtaposed convex-concave relation.

7. The apparatus of claim 3 wherein one of said convex ninth and concave eleventh sides is adhesively bonded to one of said convex first and concave third sides in a juxtaposed convex-concave relation.

8. The apparatus of claim 4 wherein one of said convex ninth and concave eleventh sides is adhesively bonded to one of said convex first and concave third sides in a juxtaposed convex-concave relation.

9. A multi-element ophthalmic lens comprising, a plurality of two element lens pairs bonded together, each two element pair comprising, a. a first optical element having a smooth, front, convex said defining a first preselected curved shape, a rear side defining a second preselected curved shape which is toric and reduced in thickness by a first plurality of Fresnel echelons and made of a material having a first index of refraction, b. a second optical element having a smooth, rear, concave side defining a third preselected curved shape identical to said first preselected curved shape, a front side defining a fourth shape which is toric and reduced in thickness by a second plurality of Fresnel echelons mating with said first plurality of Fresnel echelons and made of a material having a second index of refraction, and c. a bonding means for bonding said first and second elements together and bonding pair elements at rotational angles of said first and second optical elements such that the alignment of said toric shapes gives a desired ophthalmic correction.

10. The apparatus of claim 9 wherein said second and fourth preselected shapes of a second two element pair bonded to said first two element pair are prismatic surfaces reduced in thickness by Fresnel echelons.

11. The apparatus of claim 9 wherein said second and fourth preselected shapes of a second two element pair bonded to said first two element pair are bifocal surfaces reduced in thickness by Fresnel echelons.

12. The apparatus of claim 9 wherein said second and third preselected shapes of a third two element pair bonded to one of said first and second two element pairs are prismatic surfaces reduced in thickness by Fresnel echelons.

13. The apparatus of claim 9 wherein said second and third preselected shapes of a third two element pair bonded to one of said first and second two element pairs are bifocal surfaces reduced in thickness by Fresnel echelons.

14. An ophthalmic lens comprising, a first optical element having a front, convex, side defining a first preselected curved shape, a rear side defining a second preselected curved shape reduced in thickness by a plurality of Fresnel echelons and made of a material having a preselected first index of refraction, a second optical element having a rear, concave, side defining a third preselected curved shape identical to said first preselected curved shape, a front side defining a fourth curved, preselected shape, reduced in thickness by a second plurality of Fresnel echelons mating with said first plurality of Fresnel echelons and made of a material having a second index of refraction, a first bonding means for bonding said first and second optical elements together, a third optical element having a front, convex, side defining a fifth preselected curved shape, reduced in thickness by a third plurality of Fresnel echelons and made of a material having a third index of refraction, a fourth optical element having a rear, concave side defining a seventh preselected curved shape, identical to said fifth preselected curved shape which, in turn, is identical to said first preselected curved shape, a front side defining an eighth curved, preselected shape reduced in thickness by a fourth plurality of Fresnel echelons mating with said third plurality of Fresnel echelons and made of a material having a fourth index of refraction, and second bonding means for bonding said third and fourth optical elements together and third bonding means for bonding the combination of first and second optical elements to the combination of third and fourth optical elements.

* * * * *